United States Patent [19]

Yoshimura et al.

[11] Patent Number: 4,508,946
[45] Date of Patent: Apr. 2, 1985

[54] MICROWAVE OVEN WITH ROTARY ANTENNA

[75] Inventors: Hirofumi Yoshimura; Nobuo Ikeda, both of Nara, Japan

[73] Assignee: Matsushita Electric Industrial Co., Ltd., Kadoma, Japan

[21] Appl. No.: 473,343

[22] Filed: Mar. 8, 1983

[30] Foreign Application Priority Data

Mar. 11, 1982 [JP] Japan .................................. 57-38441
Mar. 12, 1982 [JP] Japan .................................. 57-39806

[51] Int. Cl.³ ............................................. H05B 6/64
[52] U.S. Cl. ........................ 219/10.55 F; 219/10.55 R
[58] Field of Search .................. 219/10.55 F, 10.55 R, 219/10.55 B, 10.55 E

[56] References Cited

U.S. PATENT DOCUMENTS

| | | | |
|---|---|---|---|
| 4,028,521 | 6/1977 | Uyeda et al. ................. | 219/10.55 F |
| 4,185,181 | 1/1980 | Kaneko et al. ............... | 219/10.55 F |
| 4,284,868 | 8/1981 | Simpson ....................... | 219/10.55 F |
| 4,304,974 | 12/1981 | Ikeda et al. .................. | 219/10.55 F |
| 4,316,069 | 2/1982 | Fitzmayer ..................... | 219/10.55 F |

FOREIGN PATENT DOCUMENTS 56-15594 2/1981 Japan .

Primary Examiner—Roy N. Envall, Jr.
Assistant Examiner—Marvin M. Lateef
Attorney, Agent, or Firm—Wenderoth, Lind & Ponack

[57] ABSTRACT

A microwave oven with a rotary antenna for feeding electromagnetic waves to a heating chamber. The antenna has a first antenna portion and a second antenna portion which extend in mutually opposite directions and substantially at right angles to a rotary shaft portion, the length of the first antenna portion being greater than that of the second antenna by approximately one quarter of the wavelength of the electromagnetic waves used and the free end of the first antenna portion being bent substantially at right angles thereto for a length not exceeding one quarter of the wavelength to thereby ensure a uniform electric field distribution within the heating chamber. A dielectric seal plate supporting the rotating shaft of the rotary antenna has a tapered cross-sectional configuration projecting into a waveguide to prevent a sharp change of impedance in the waveguide, whereby spark discharge due to a high frequency electric field is effectively prevented even in the absence of a heating load in the heating chamber.

3 Claims, 5 Drawing Figures

MICROWAVE OVEN WITH ROTARY ANTENNA

BACKGROUND OF THE INVENTION

This invention relates to a high-frequency heating apparatus for performing dielectric heating in accordance with a cavity resonance principle employing high-frequency electromagnetic waves.

As methods of effecting a uniform heating of a heating load in accordance with a cavity resonance (heating chamber) principle employing high-frequency electromagnetic waves, there are known a stirrer system which is adapted to stir the high-frequency magnetic waves, a turntable system which rotates the heating load which is carried on a turntable, and a rotary antenna system wherein a high-frequency electromagnetic energy radiator is rotated. Of these diverse systems, the rotary antenna system has been used the most frequently in compact-type household microwave ovens, for the antenna occupies only a limited space within the heating chamber so as to leave a large effective heating space. The rotary antenna having a substantially L-configuration is disclosed in U.S. Pat. No. 4,316,069 and causes the heating chamber to be excited mainly by a vertical electric field from the center of rotation and a revolving horizontal electric field. Therefore, it is the horizontal electric field that contributes to uniform energy distribution. Since the excitation by the horizontal electric field is liable to vary greatly with a horizontal or flat load, the degree of uniformity of electric field distribution is altered a great deal by a variation in the shape of the load in the horizontal plane. In the system described in U.S. Pat. No. 4,028,521 there is no radiation of waves from the rotary shaft but instead a horizontal electric field is radiated from a revolving horizontal antenna, with the result that the degree of uniformity of electric field varies widely with variations in the shape of the load in the horizontal plane.

In the system described in Japanese Patent Laid-open No. 15594/1971 (Tokkai-Sho-56-15594), the radiation of electromagnetic waves from the center of rotation is controlled by adjusting the length of the horizontal antenna connected to the antenna at the center of rotation in order to prevent radiation of waves from the center of rotation. However, since the direction of the electric field radiation during rotation is horizontal, the system has the same disadvantage as that of the above prior art systems.

OBJECTS OF THE INVENTION

It is an object of the invention to provide an improved electric field distribution of high-frequency electromagnetic energy in a rotary antenna system.

It is another object of this invention to ensure a stable and constant electric field distribution irrespective of changes in load.

It is still another object to provide an improved seal plate construction at the connection between the waveguide and the heating chamber to thereby prevent a sharp change of impedance in the neighborhood of the antenna and ensure a stable performance without such troubles as spark discharge.

SUMMARY OF THE INVENTION

To this end the present invention provides a rotary antenna adapted to revolve for establishing a uniform electric energy distribution within the heating chamber for heating a heating load such as food. The antenna is comprised of a first antenna portion and a second antenna portion which extend in mutually an antenna portion B which are disposed in mutually opposite directions and substantially at right angles to a rotating shaft of the antenna, the length of said first antenna portion being greater than that of said second antenna portion by approximately one-quarter of the wavelength of the electric energy used and the free end of said first antenna portion being bent substantially at right angles therewith a length less than one-quarter of said wavelength, and the bearing portion of a seal plate for sealing an energy feeding port of a waveguide for supplying high frequency electromagnetic energy into the heating chamber via the rotary antenna has a tapered configuration. Moreover, the length of the portion of said rotary antenna serving as a revolving shaft thereof is not greater than about one-eighth of the wavelength of said electromagnetic waves.

DETAILED DESCRIPTION OF THE PREFERRED EMBODIMENT

Preferred embodiments of this invention will now be described with reference to the accompanying drawings.

Figure 1:
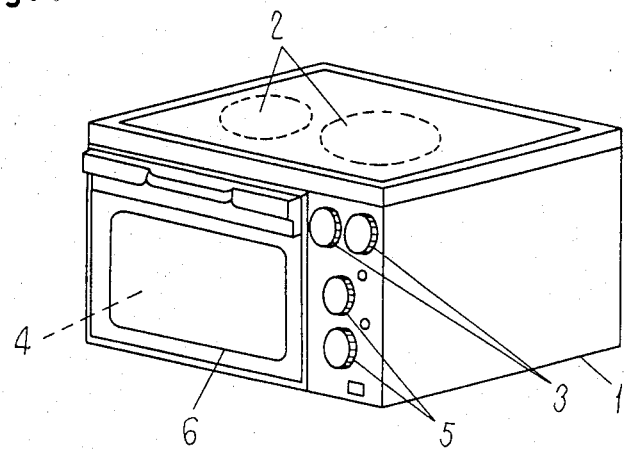
FIG. 1 is an exterior perspective view showing an example of a microwave heating apparatus according the principles of this invention.

In FIG. 1, there is shown a home microwave oven equipped with heater plates 2. Provided atop an oven body 1 are a couple of heater plate 2 for boiling foodstuffs, for instance. The electric current supplied to the heater plates 2 is controlled by means of two control knobs 3 on the body 1. The resistance heating and high-frequency heating within a heating chamber 4 are controlled by control knobs 5. An access door for putting a heating load into and removing it from the heating chamber is disposed across a front side of a heating chamber 4.

Figure 2:
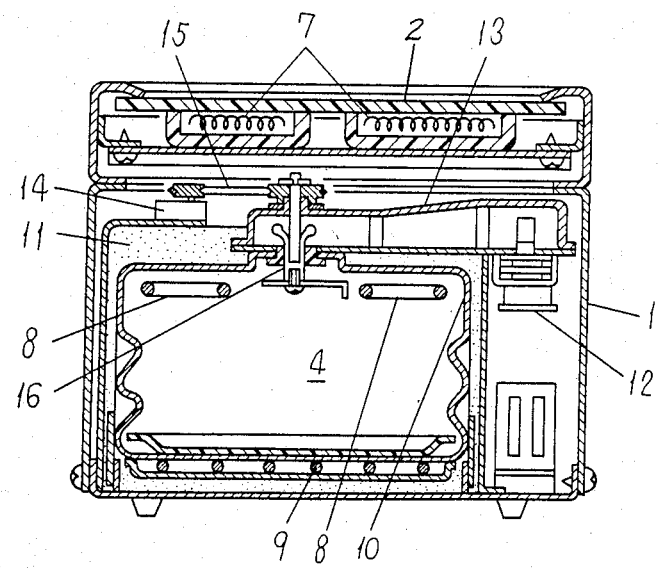
FIG. 2 is a sectional side-elevation view of the same apparatus.

Referring to FIG. 2, disposed atop of said oven body 1 are heater plates 2 which are made of heat-resistant material so that cooking in vessels placed thereon may be carried out by means of plate heaters 7. Oven heaters 8 and 9 are disposed at a top and a bottom level within the heating chamber 4 for oven heating and browning. Disposed externally of a wall member 10 defining said heating chamber 4 is a heat-resistant insulation 11 for preventing dissipation of heat from the chamber.

High frequency electromagnetic energy from a high frequency wave generator, i.e. a magnetron 12, is propagated through a tapered waveguide 13 and fed into the heating chamber 4 via a rotary antenna 16 driven by a motor 14 via a belt 15.

Figure 3:
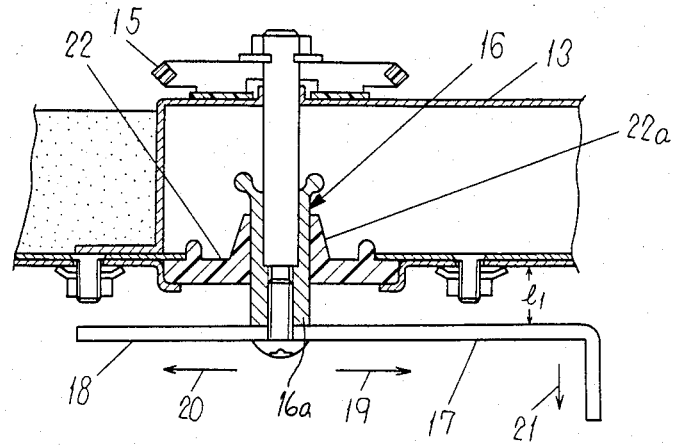
FIG. 3 is an enlarged cross-section view of a part of the apparatus of FIG. 2.

Referring to FIG. 3, the high frequency electromagnetic waves are radiated from the rotary antenna revolving in the heating chamber. However, if the length $l_1$ of the portion of the shaft $16a$ of rotary antenna 16 which extends into the heating chamber 4 is too large with respect to the size of the heating chamber 4, the electromagnetic waves are not effectively propagated to the tip of the antenna 16. It is preferably no greater than about one-eight of the wave-length of the electromagnetic waves. Moreover, if the first antenna portion 17 and the second antenna portion 18 have high propagation impedances, they radiate the energy prematurely into the heating chamber 4 so that the electromagnetic waves will not be propagated to the tip of the first antenna portion 17. Therefore, in order to reduce the propagation impedance, the lateral dimensions of antenna portions 17 and 18 are made greater than $l_1$, i.e. the distance between the wall of the heating chamber 4 and the antenna portions 17 and 18, whereby the radiation of energy into the heating chamber 4 from said antenna portions is minimized. However, a certain amount of electromagnetic waves are unavoidably radiated into the heating chamber 4 by these antenna portions. However, since the electric fields 19 and 20 of the antenna portions 17 and 18 are opposite to each other, they cancel each other so that there is substantially no radiation of energy into the heating chamber 4.

Thus the excitation within the heating chamber 4 is almost solely derived from the difference in length between the first antenna portion 17 and the second antenna portion 18. Moreover, since the free end of the first antenna portion 17 is bent substantially at right angles to the remainder thereof, the electromagnetic waves are radiated into the chamber 4 substantially only by a vertical electric field 21. Excitation of the heating chamber 4 by the vertical electric field 21 causes a vertical electric field excitation in the heating chamber 4. This vertical electric field is hardly affected by loads (e.g. foods) having predominant surfaces perpendicular to its direction, with the result that flat loads can be evenly heated. The vertical electric field is affected by loads in cups or similar containers (loads extending a great deal in the same direction as the vertical electric field) but it is usually not so important to uniformly heat such loads as compared with flat loads.

Figure 4:
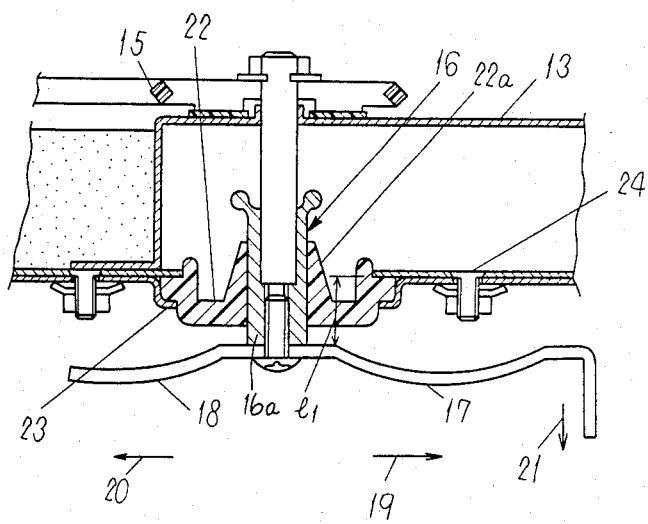
FIG. 4 is an enlarged cross-sectional view similar to FIG. 3 of a part of another embodiment of this invention.

FIG. 4 illustrates another embodiment of this invention.

Referring to FIG. 4, when the heating chamber 4 includes a metallic projection 23 for mounting a seal plate 22, and screws 24 for connecting the waveguide 20 to the heating chamber 4, the top wall of the heating chamber 4 is substantially bulged downwardly. Therefore, in order to ensure a satisfactory propagation of electromagnetic waves in the antenna portions 17 and 18, that is to say for the purpose of providing for a constant distance of $l_1$, the antenna portions 17 and 18 are respectively curved with an optimum radius of curvature.

Figure 5:
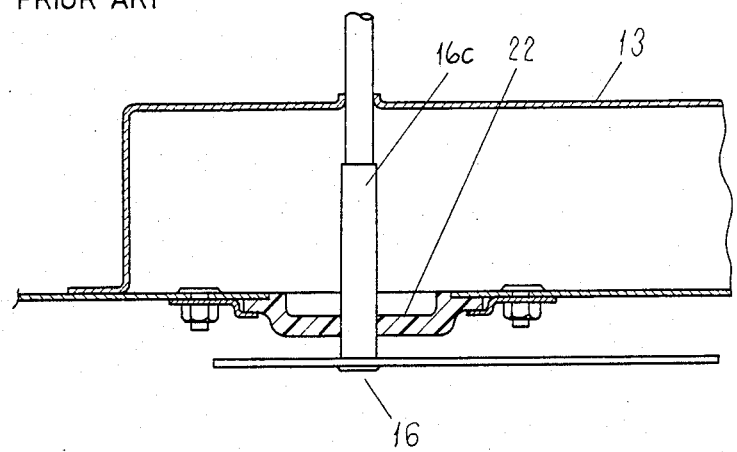
FIG. 5 is a cross-sectional view of a prior art rotary antenna.

The seal plate 22 rotatably supporting the rotary antenna projects into the waveguide 13 covering the vertical shaft of the antenna 16 and has a substantially truncated-conical portion 22a which is tapered and increased in diameter toward the energy feeding port of the waveguide 13. By ensuring that a portion of the seal plate 22 projects into the waveguide and has a tapered shape as described above, the variation of impedance at the boundary between the air and the seal plate 22 is made gradual so as to reduce the wave reflection in the neighborhood to a minimum. This arrangement eliminates an abnormal local concentration of electric field so that operation and a low load or without a load will not cause sparks or other abnormalities. Moreover, in the case of the conventional seal plate 22c shown in FIG. 5, where its area of contact with the vertical shaft 16c of an antenna 16 is small, the antenna 16 must be rotatably supported additionally at the position of an opening through a top wall of the waveguide 13, with the result that if the relative position of said opening in waveguide 13 and said opening in the seal plate is disturbed, the antenna will be tipped or will not revolve smoothly. However, the seal plate according to this invention provides a sufficient area of contact with the vertical portion of the antenna 16 and, therefore, enables the antenna to be rotatably supported without resort to any additional supporting means, thus eliminating the cause of troubles such as tipping or an increased resistance to revolution of the antenna.

In accordance with this invention, there are obtained the following advantages.

(1) Since the electromagnetic waves are propagated to the tip of the antenna without reflections, the energy distribution performance of the revolving antenna is greatly improved.

(2) Since the energy distribution is made uniform by the revolving vertical electric field only, the uniformity of distribution is least affected by variations of the load.

(3) Since the horizontal electric fields cancel each other, there is substantially no horizontal electric field that will adversely affect the distribution.

(4) Since there is no major change in the characteristic (propagation) impedance at the rotary antenna, i.e. at the connection between the waveguide and the heating chamber as well as in that of the horizontal antenna portions, the reflection of electromagnetic waves in these regions is small.

(5) Since the antenna portions 17 and 18 can be constructed of flat plate material, the production cost is minimized.

(6) Since there is no radiation of electromagnetic waves from the rotary antenna portion corresponding to the rotating shaft, the effect of the rotary antenna is very great.

(7) It is possible, by means of a simple construction, to prevent sharp changes in impedance in the neighborhood of the antenna and, hence, preclude occurrence of sparks even under a light load or no load and also to provide a high-frequency heating appliance having a stabilized performance without such troubles as tipping and resistance to rotation of the antenna.

What is claimed is:

1. A high-frequency heating apparatus comprising:
a heating chamber for accommodating a heating load;
a high frequency oscillator for generating high frequency electromagnetic waves;
a waveguide extending from said oscillator for propagating said high frequency electromagnetic waves; and
a rotary antenna between said waveguide and the interior of said heating chamber for feeding said electromagnetic waves into said heating chamber, said rotary antenna having a rotary shaft extending from said waveguide into said heating chamber, a first antenna portion and a second antenna portion mounted on the end of said shaft in said heating chamber and extending at substantially right angles to said shaft in opposite directions therefrom, said first antenna portion having a greater length than said second antenna portion by approximately one quarter of the wavelength of said high frequency electromagnetic waves, and the free end of said first antenna portion being bent about 90 degrees to the first antenna portion in a direction toward the central part of the interior of said chamber and the thus bent portion having a length not exceeding one quarter of the wavelength of said electromagnetic waves.

2. A high frequency heating apparatus according to claim 1 wherein the length of the portion of said shaft in said heating chamber is not greater than about one-eighth of the wavelength of said electromagnetic waves.

3. A high frequency heating apparatus according to claim 1 wherein the lateral dimension of said antenna portions is greater than the distance between the wall of the heating chamber through which said shaft extends and said antenna portions.

* * * * *